(12) United States Patent
Sahlsten et al.

(10) Patent No.: US 10,718,949 B1
(45) Date of Patent: Jul. 21, 2020

(54) DISPLAY APPARATUS AND METHOD OF DISPLAYING

(71) Applicant: Varjo Technologies Oy, Helsinki (FI)

(72) Inventors: Oiva Arvo Oskari Sahlsten, Salo (FI); Urho Konttori, Helsinki (FI); Klaus Melakari, Oulu (FI)

(73) Assignee: Vargo Technologies Oy, Helsinki (FI)

( * ) Notice: Subject to any disclaimer, the term of this patent is extended or adjusted under 35 U.S.C. 154(b) by 19 days.

(21) Appl. No.: 16/260,254

(22) Filed: Jan. 29, 2019

(51) Int. Cl.
| | |
|---|---|
| *G02B 27/01* | (2006.01) |
| *G02B 25/00* | (2006.01) |
| *G02B 7/04* | (2006.01) |
| *G06F 3/01* | (2006.01) |
| *G02B 27/00* | (2006.01) |

(52) U.S. Cl.
CPC ........... *G02B 27/0172* (2013.01); *G02B 7/04* (2013.01); *G02B 25/001* (2013.01); *G02B 27/0025* (2013.01); *G06F 3/013* (2013.01)

(58) Field of Classification Search
CPC . G02B 27/017–2027/0178; G02B 7/04; G02B 25/001; G02B 27/0025; G02B 7/12; G06F 3/013
See application file for complete search history.

(56) References Cited

U.S. PATENT DOCUMENTS

| | | | | |
|---|---|---|---|---|
| 2004/0070825 A1* | 4/2004 | Charlesworth | ........... | G02B 7/12 359/462 |
| 2012/0162764 A1* | 6/2012 | Shimizu | ................... | G02B 7/12 359/473 |
| 2016/0005231 A1* | 1/2016 | Yamaga | ................... | G02B 7/12 345/633 |
| 2016/0341967 A1* | 11/2016 | Kaji | ........................ | G02C 5/045 |
| 2017/0237977 A1* | 8/2017 | Patel | ................... | G02B 27/0176 348/53 |
| 2019/0317331 A1* | 10/2019 | Nam | ................... | G02B 27/0176 |

* cited by examiner

*Primary Examiner* — Michael Pervan (57) ABSTRACT

A display apparatus includes a plurality of housings connected by adjustable device for setting spacing between centers of the plurality of housings, each housing including: first image source mounted to side of housing; second image source mounted to housing angularly offset from first image source, wherein second image source includes higher resolution and narrower image field of view than first image source; optical combiner positioned in housing between first and second image sources, on which first image from first image source and second image from second image source are superimposed and made visible to user's eye; magnification lens for magnifying second image to increase image field of view; eyepiece lens for reducing focal distance between the optical combiner and the user's eye; and controller configured to control output of second image source to render colors to compensate for distortion and chromatic aberrations introduced by magnification lens.

39 Claims, 3 Drawing Sheets

DISPLAY APPARATUS AND METHOD OF DISPLAYING

TECHNICAL FIELD

The present disclosure relates generally to display apparatuses; and more specifically, to display apparatuses comprising housings, said housings comprising image sources, optical combiners, magnification lenses, eyepiece lenses and controllers. Moreover, the present disclosure also relates to methods of displaying via the aforementioned display apparatuses.

BACKGROUND

Nowadays, several technologies (for example, such as virtual reality, augmented reality, and the like) are being developed for presenting a simulated environment to a user. Such technologies provide the user with a feeling of complete involvement (namely, immersion) within the simulated environment by employing techniques such as stereoscopy. As a result, when the user views the simulated environment, he/she is provided with an enhanced perception of reality around him/her. Moreover, such simulated environments relate to fully virtual environments (namely, virtual reality environments) as well as real world environments including virtual objects therein (for example, such as augmented reality environments, mixed reality environments, and the like).

Typically, the user uses a specialized device (for example, such as a virtual reality device, an augmented reality device, a mixed reality device, and the like) for viewing such simulated environments. Generally, the specialized device displays different views of a given image on separate display optics for both eyes of the user. As a result, the user is able to perceive stereoscopic depth within the given image. Examples of the specialized devices include virtual reality headsets, a pair of virtual reality glasses, augmented reality headsets, a pair of augmented reality glasses, mixed reality headsets, a pair of mixed reality glasses, and the like.

However, conventional specialized devices have certain limitations associated therewith. Firstly, the specialized devices contain a large number of components having different shapes, sizes and functionalities. For proper functioning thereof, certain components are required to be arranged at certain specific positions or within specific regions of the specialized device. Secondly, an optical path of light as it travels within such specialized devices is complex and depends on an arrangement of the components within the display apparatus. These requirements pose design constraints on the specialized devices. Nowadays, some specialized devices are designed to be large in size, in order to provide ample space for accommodating their components. However, such large sized specialized devices are often bulky and cumbersome to use. Alternatively, some specialized devices are designed to be small in size. In such small sized specialized devices, accommodating such components within the specialized devices is challenging due to space limitations and/or optical path requirements.

Therefore, in light of the foregoing discussion, there exists a need to overcome the aforementioned drawbacks associated with within conventional specialized devices.

SUMMARY

The present disclosure seeks to provide a display apparatus. The present disclosure also seeks to provide a method of displaying using a display apparatus having a plurality of housings. The present disclosure seeks to provide a solution to the existing problem of complex arrangement of components and bulkiness associated with conventional display apparatuses. An aim of the present disclosure is to provide a solution that overcomes at least partially the problems encountered in prior art, and provides a compact display apparatus having a simple arrangement of components.

In one aspect, an embodiment of the present disclosure provides a display apparatus comprising:
a plurality of housings connected by an adjustable device for setting a spacing between centers of the plurality of housings, each of the housings comprising:
a first image source mounted to a side of the housing;
a second image source mounted to the housing angularly offset from the first image source, wherein the second image source comprises a higher resolution and a narrower image field of view than the first image source;
an optical combiner positioned in the housing between the first and second image sources, on which a first image from the first image source and a second image from the second image source are superimposed and made visible to a user's eye;
a magnification lens for magnifying the second image to increase the image field of view, wherein the magnification lens is attached to the housing between the second image source and the optical combiner;
an eyepiece lens for reducing a focal distance between the optical combiner and the user's eye, wherein the eyepiece lens is mounted to a side of the housing opposite the first image source, wherein the eyepiece lens is interposed between the optical combiner and the user's eye; and
a controller configured to control an output of the second image source to render colors to compensate for distortion and chromatic aberrations introduced by the magnification lens.

In another aspect, an embodiment of the present disclosure provides a method of displaying using a display apparatus having a plurality of housings, the method comprising:
connecting the plurality of housings by an adjustable device for setting a spacing between centers of the plurality of housings;
within each housing:
using an optical combiner to:
superimpose a first image from a first image source mounted to a side of the housing, and a second image from a second image source mounted to the housing angularly offset from the first image source; and
make visible to a user's eye the superimposed first and second images, wherein the second image source comprises a higher resolution and a narrower image field of view than the first image source;
using a magnification lens, attached to the housing between the second image source and the optical combiner, to magnify the second image to increase the image field of view;
using an eyepiece lens, mounted to a side of the housing, opposite the first image source and interposed between the optical combiner and the user's eye, to reduce a focal distance between the optical combiner and the user's eye; and
using a controller to control an output of the second image source to render colors to compensate for distortion and chromatic aberrations introduced by the magnification lens.

Embodiments of the present disclosure substantially eliminate or at least partially address the aforementioned problems in the prior art, and provides a display apparatus having a user-friendly size and proper arrangement of components.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:
a plurality of housings connected by an adjustable device for setting a spacing between centers of the plurality of housings, each of the housings comprising:
a first image source mounted to a side of the housing;
a second image source mounted to the housing angularly offset from the first image source, wherein the second image source comprises a higher resolution and a narrower image field of view than the first image source;
an optical combiner positioned in the housing between the first and second image sources, on which a first image from the first image source and a second image from the second image source are superimposed and made visible to a user's eye;
a magnification lens for magnifying the second image to increase the image field of view, wherein the magnification lens is attached to the housing between the second image source and the optical combiner;
an eyepiece lens for reducing a focal distance between the optical combiner and the user's eye, wherein the eyepiece lens is mounted to a side of the housing opposite the first image source, wherein the eyepiece lens is interposed between the optical combiner and the user's eye; and
a controller configured to control an output of the second image source to render colors to compensate for distortion and chromatic aberrations introduced by the magnification lens.

In another aspect, an embodiment of the present disclosure provides a method of displaying using a display apparatus having a plurality of housings, the method comprising:
connecting the plurality of housings by an adjustable device for setting a spacing between centers of the plurality of housings;
within each housing:
using an optical combiner to:
superimpose a first image from a first image source mounted to a side of the housing, and a second image from a second image source mounted to the housing angularly offset from the first image source; and
make visible to a user's eye the superimposed first and second images, wherein the second image source comprises a higher resolution and a narrower image field of view than the first image source;
using a magnification lens, attached to the housing between the second image source and the optical combiner, to magnify the second image to increase the image field of view;
using an eyepiece lens, mounted to a side of the housing, opposite the first image source and interposed between the optical combiner and the user's eye, to reduce a focal distance between the optical combiner and the user's eye; and using a controller to control an output of the second image source to render colors to compensate for distortion and chromatic aberrations introduced by the magnification lens.

The present disclosure provides the aforementioned display apparatus and the aforementioned method of displaying using such a display apparatus. The display apparatus described herein has a simple arrangement of components within the display apparatus. Notably, the described display apparatus includes few, small-sized components which are properly accommodated at suitable positions within the display apparatus. The described arrangement and specifications of such components allow for displaying a visual scene of a simulated environment to the user of the display apparatus when the display apparatus is used by the user. Furthermore, the aforesaid display apparatus is user friendly since it is compact and lightweight.

Throughout the present disclosure, the term "display apparatus" refers to specialized equipment that is configured to present a simulated environment to the user when the display apparatus, in operation, is worn by the user on his/her head. In such an instance, the display apparatus acts as a device (for example, such as a virtual reality headset, a pair of virtual reality glasses, an augmented reality headset, a pair of augmented reality glasses, a mixed reality headset, a pair of mixed reality glasses, and so forth) that is operable to present a visual scene of the simulated environment to the user. The display apparatus may also commonly be referred to as "head-mounted display apparatus".

The display apparatus comprises the plurality of housings. Throughout the present disclosure, the term "housing" refers to an outer covering that encloses and protects various components of the display apparatus. Beneficially, the plurality of housings protects such components from any damage caused by dust, heat and the like.

The plurality of housings are connected by the adjustable device. Notably, the adjustable device is employed for setting the spacing between centers of the plurality of the housings. In other words, the adjustable device is employed for adjusting (namely, increasing or decreasing) the spacing between the centers of the plurality of housings, as per requirement. Therefore, a space is created between the plurality of housings to accommodate various components. Each of the plurality of housings comprises the first image source, the second image source, the optical combiner, the magnification lens, the eyepiece lens and the controller.

It will be appreciated that the space created between centers the plurality of housings when joined together forms an internal region to accommodate various components therein. Such an internal region may also commonly be referred to as an "optical chamber".

In an exemplary implementation, the display apparatus comprises one optical chamber per eye of the user. In such a case, separate optical chambers for a left eye and a right eye of the user are formed in the display apparatus. When the display apparatus comprises separate components (for example, such as the first image source and the second image source) for the left eye and the right eye, such separate optical chambers enclose said separate components. As an example, separate first images and separate second images for the left eye and the right eye of the user may be displayed using separate first image sources and separate second image sources for the left eye and the right eye, respectively. The separate first images for the left eye and the right eye collectively constitute the first image whereas the separate second images for the left eye and the right eye collectively constitute the second image.

In another exemplary implementation, the display apparatus comprises a single optical chamber for both eyes of the user. In such a case, the single optical chamber encloses various components of the display apparatus for both the left eye and the right eye on a shared basis. As an example, the display apparatus may comprise a single first image source and a single second image source to be used for both eyes of the user on a shared basis. The single first image source and the single second image source are used to display a single first image and a single second image for both the left eye and the right eye, respectively, on the shared basis.

Optionally, the optical chamber has a hole covered with Gore-Tex® or similar. Beneficially, the Gore-Tex® prevents dust from entering the optical chamber. Furthermore, the Gore-Tex® allows controlled adjustment of external air pressure.

Optionally, the adjustable device comprises a motorized threaded shaft connected between the plurality of housings. Notably, the motorized threaded shaft mechanically couples the plurality of housings in a manner that the space is created between the plurality of housings. The adjustable device moves the plurality of housings closer to or farther from each other to adjust the spacing between the centers of the plurality of housings. In an example, the adjustable device may comprise a pair of rails and motorized screw for rotatably moving the plurality of housings closer to or away from each other.

Throughout the present disclosure, the term "image source" refers to equipment that, when employed, renders a given image. Beneficially, a given image source has a same resolution throughout its array of pixels. In other words, the given image source has a same pixel density throughout the entire array of pixels. When the given image is rendered via the given image source, a projection of the given image emanates from an image rendering surface of the given image source.

Throughout the present disclosure, the term "projection of the given image" refers to a collection of light rays emanating from a given image source when the given image is rendered thereat. The projection of the given image (namely, the collection of light rays) may transmit through and/or reflect from the optical element and various other components of the display apparatus before reaching the user's eye. For purposes of embodiments of the present disclosure, the term "projection of the given image" has been used consistently, irrespective of whether the collection of light rays is transmitted or reflected.

The first image source is mounted to the side of the housing and the second image source is mounted to the housing angularly offset from the first image source. In other words, the first and second image sources are arranged in a manner that the second image source is positioned at a given angle from the first image source. Notably, the second image source is arranged in a manner that a center of gravity of the head-mounted display apparatus is close to a head of the user when the display apparatus, in operation, is worn by the user on his/her head. In such a case, the second image source is positioned towards the eyepiece lens.

Optionally, the first image source and/or the second image source is/are implemented as a display. Optionally, the display is selected from the group consisting of: a Liquid Crystal Display (LCD), a Light Emitting Diode (LED)-based display, an Organic LED (OLED)-based display, a micro OLED-based display, a Liquid Crystal on Silicon (LCoS)-based display, and a Cathode Ray Tube (CRT)-based display.

Optionally, the first image source and/or the second image source is/are implemented as a projector and a projection screen associated therewith. Optionally, the projector is selected from the group consisting of: an LCD-based projector, an LED-based projector, an OLED-based projector, an LCoS-based projector, a Digital Light Processing (DLP) ®-based projector, and a laser projector.

It will be appreciated that the first image source is employed to render the first image thereon and the second image source is employed to render the second image thereon. Notably, the first image and the second image collectively constitute an input image depicting the visual scene that is to be presented to the user, via the display apparatus. Therefore, the "first image" and the "second image" can be understood to correspond to a first portion and a second portion of the input image, respectively.

Optionally, the first image corresponds to an entirety of the input image whereas the second image corresponds to a specific portion of the input image. In other words, a size (namely, dimensions) of the second image is smaller as compared to a size (namely, dimensions) of the first image. Therefore, dimensions of the first image source are larger as compared to dimensions of the second image source.

Optionally, the sizes of the first image source and the second image source are measured as a diagonal dimension of the first image source and the second image source, respectively. Notably, the diagonal dimension of a given image source is measured as a distance between two diagonal points (namely, two diagonal corners) of the given image source.

Optionally, the first image source has the diagonal dimension of between approximately 2 and 4 inches. In other words, the diagonal dimension of the first image source lies in a range of 2 inches to 4 inches. For example, the diagonal dimension of the first image source may be from 2, 2.2, 2.4, 2.6, 2.8, 3, 3.2, 3.4, 3.6 or 3.8 inches up to 2.2, 2.4, 2.6, 2.8, 3, 3.2, 3.4, 3.6, 3.8 or 4 inches. In an example implementation, the first image source may have the diagonal dimension of 3.2 inches.

Alternatively, optionally, the first image source has the diagonal dimension of approximately lesser than 2 inches or greater than 4 inches. In other words, the diagonal dimension of the first image source is lesser than 2 inches or greater than 4 inches. In an example, the diagonal dimension of the first image source may be 1, 1.2, 1.4, 1.6, 1.8 or 2 inches. In another example, the diagonal dimension of the first image source may be 4, 4.2, 4.4, 4.6, 4.8, 5, 5.2, 5.4, 5.6, 5.8 or 6 inches.

Optionally, the second image source has the diagonal dimension of between approximately 0.5 and 1.5 inches. In other words, the diagonal dimension of the second image source lies in a range of 0.5 inches to 1.5 inches. For example, the diagonal dimension of the second image source may be from 0.5, 0.6, 0.7, 0.8, 0.9, 1, 1.2, 1.3 or 1.4 inches up to 0.6, 0.7, 0.8, 0.9, 1, 1.2, 1.3, 1.4 or 1.5 inches. In an example implementation, the second image source may have the diagonal dimension of 0.7 inches.

Alternatively, optionally, the second image source has the diagonal dimension of approximately greater than 1.5 inches. In other words, the diagonal dimension of the second image source is greater than 1.5 inches. In an example, the diagonal dimension of the second image source may be 1.5, 1.6, 1.7, 1.8, 1.9 or 2 inches.

As mentioned previously, the second image source comprises the higher resolution and the narrower field of view than the first image source. In other words, the second image source acts as a high-resolution image source as compared to the first image source which acts as a low-resolution image source. Therefore, the second image (rendered by the second image source) relates to a high-resolution representation of the second portion of the input image and the first image (rendered by the first image source) relates to a low-resolution representation of the input image.

Throughout the present disclosure, the term "resolution" of a given image source refers to a display resolution of the given image source. Notably, the display resolution of the given image source refers to pixel density (namely, pixels per unit area) within the given image source. It will be appreciated that an image resolution of a given image is same as the resolution of the given image source by which said given image is rendered. The term "image resolution" refers to a detail that a given image holds. The image resolution is typically measured as the number of pixel values per unit area associated with a given image.

Optionally, the first image source has a resolution of between approximately 0.5 and 5.0 megapixels. In other words, the resolution of the first image source lies in a range of 0.5 megapixels to 5.0 megapixels. More optionally, the first image source has the resolution of between approximately 1.2 and 3.2 megapixels. In other words, more optionally, the resolution of the first image source lies in a range of 1.2 megapixels to 3.2 megapixels. For example, the resolution of the first image source may be from 0.5, 0.6, 0.8, 1, 1.2, 1.4, 1.6, 1.8, 2, 2.2, 2.4, 2.6, 2.8, 3, 3.2, 3.4, 3.6, 3.8, 4, 4.2, 4.4, 4.6 or 4.8 megapixels up to 0.6, 0.8, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8 or 5 megapixels. In an example implementation, the first image source may have the resolution of 2 megapixels.

Optionally, the first image source has a resolution of approximately 1600×1200 pixels. In such a case, the first image source has a resolution of approximately 1.92 megapixels. Furthermore, such an image source has a 4:3 aspect ratio.

Alternatively, optionally, the first image source has a resolution of approximately 960×720 pixels, 1024×768 pixels, 1280×960 pixels, 1400×1050 pixels, 1440×1080 pixels, 1856×1392 pixels, 1920×1440 pixels, or 2048×1536 pixels.

Optionally, the second image source has a resolution of approximately 1920×1080 pixels. In such a case, the second image source has a resolution of approximately 2.07 megapixels. Furthermore, such an image source has a 16:9 aspect ratio.

Alternatively, optionally, the second image source has a resolution of approximately 2560×1440 pixels or 3840×2160 pixels.

Optionally, the second image source has a 10 micrometer pixel size and a 3 micrometer sub-pixel size. The term "pixel size" refers to a size of pixels of a given image source. Notably, the pixel size of the given image source is measured as distance between diagonal vertices of pixels of the given image source. Notably, each pixel of the given image source comprises a plurality of sub-pixels. In an example, each pixel may have three sub-pixels arranged either vertically (namely, one on top of the other) or horizontally (namely, one next to the other).

Optionally, the first image source and the second image source have a PenTile® arrangement of the pixels. In an example, the PenTile® arrangement of the pixels follows a RGBG layout. In such an example, the number of green sub-pixels is twice the number of blue sub-pixels as well as twice the number of red sub-pixels. In particular, the number of green sub-pixels is equal to a total number of blue and red sub-pixels. Beneficially, such an arrangement of the pixels leverages optical properties of human vision which is more sensitive to green color for displaying the first and second images. In another example, the PenTile® arrangement of the pixels follows a RGBW layout. Beneficially, in such an arrangement of the pixels, white pixels enhance brightness of the rendered image, thereby reducing an overall power required for projection of said image of a given brightness.

Throughout the present disclosure, the term "image field of view" refers to an angular extent of a given image source that, in operation, renders a given image. An angular extent of the given image rendered by the given image source is generally equal to the image field of view of the given image source. Notably, the field of view of each eye of the user is approximately about 115 degrees. Beneficially, the image sources having the field of view approximately equivalent to the user's eyes provide the user with a greater feeling of immersion and better awareness of the simulated environment.

In an embodiment, the first image source has a wide image field of view as compared to the second image source. In such a case, an angular width of the first image (rendered at the first image source) is greater than an angular width of the second image (rendered at the second image source). Herein, the term "angular width" refers to an angular width (namely, an angular extent) of a given image with respect to the perspective of the user's eye, namely with respect to a centre of the user's gaze. It will be appreciated that since the projection of the first image is to be incident upon the retina of the user's eye whereas the projection of the second image is to be incident upon the fovea of the user's eye, the first image source has the wide image field of view as compared to the second image source.

Optionally, the first image source has an image field of view of between approximately 70 to 140 degrees. In other words, a horizontal and vertical image field of view of the first image source lies in a range of 70 degrees to 140 degrees. In such a case, the angular width of the first image lies in a range of 70 degrees to 140 degrees. For example, the image field of view dimension of the first image source may be from 70, 75, 80, 85, 90, 95, 100, 105, 110, 115, 120, 125, 130 or 135 degrees up to 75, 80, 85, 90, 95, 100, 105, 110, 115, 120, 125, 130, 135 or 140 degrees.

Optionally, the second image source has an image field of view of between approximately 15 to 45 degrees. In other words, a horizontal and vertical image field of view of the second image source lies in a range of 15 degrees to 45 degrees. In such a case, the angular width of the second image lies in a range of 15 degrees to 45 degrees. For example, the image field of view of the second image source may be from 15, 16, 17, 18, 19, 20, 21, 22, 23, 24 25, 26, 27, 28, 29, 30, 31, 32, 33, 34, 35, 36, 37, 38, 39, 40, 41, 42, 43 or 44 degrees up to 16, 17, 18, 19, 20, 21, 22, 23, 24 25, 26, 27, 28, 29, 30, 31, 32, 33, 34, 35, 36, 37, 38, 39, 40, 41, 42, 43, 44 or 45 degrees.

The optical combiner is positioned in the housing between the first and second image sources, on which the first image from the first image source and the second image from the second image source are superimposed and made visible to the user's eye. Throughout the present disclosure, the term "optical combiner refers to equipment (for example, such as optical components) for optically combining the projection of the first image with the projection of the second image. In operation, the optical combiner optically combines the projection of the first image with the projection of the second image to constitute a combined projection, wherein the combined projection is a projection of the input image depicting the visual scene. When the display apparatus is worn and used by the user, the combined projection is incident upon the user's eye for displaying the visual scene to the user.

It will be appreciated that optical properties of the optical combiner allow for such optical combination of the first image and the second image. In some implementations, the optical combiner is implemented by way of a single optical component. In other implementations, the optical combiner is implemented by way of a plurality of optical components.

Optionally, the optical combiner is implemented by way of at least one of: a lens, a mirror, a beam splitter, a semi-transparent mirror, a semi-transparent film, a prism, an optical waveguide, a polarizer.

Optionally, the optical combiner comprises a silver-coated, semi-transparent glass mirror. Beneficially, the silver coating on the glass mirror provides a high reflectivity surface for the glass mirror, thereby providing reflective optical properties of the optical combiner. Furthermore, such mirror construction provides reflectance value that is substantially independent of the angle of the incoming light. In an example, the silver-coated, semi-transparent glass mirror may have a reflectivity of 25 percent, and a transmission (namely, transmissivity) of 70 percent. In another example the silver-coating of the mirror is further deposited with silicon dioxide ($SiO_2$).

Furthermore, the glass mirror is coated with an anti-reflective coating at a back surface of the glass mirror.

Optionally, the optical combiner comprises a semi-transparent mirror having a reflectivity of between approximately 10 to 60 percent, and a transmission of between approximately 85 to 40 percent. In other words, the reflectivity of the semi-transparent mirror lies in a range of 10 percent to 60 percent and the transmission (namely, transmissivity) lies in a range of 85 percent to 40 percent. The term "reflectivity" refers to ability of a given surface to reflect the light and the term "transmission" refers to ability of a given surface to pass (namely, transmit) the light therethrough. In an example, the semi-transparent mirror can be manufactured using a glass or plastic plate covered with a reflective metal coating or di-electric coating. For example, the semi-transparent mirror may have the reflectivity of between 10, 15, 20, 25, 30, 35, 40, 45, 50 or 55 percent up to 15, 20, 25, 30, 35, 40, 45, 50, 55 or 60 percent and the transmission of between 85, 80, 75, 70, 65, 60, 55, 50 or 45 percent up to 80, 75, 70, 65, 60, 55, 50, 45 or 40 percent.

In an embodiment, the semi-transparent mirror allows for combining two optical paths of the projections of the first and second images into a single optical path. In an example, the semi-transparent mirror may comprise a substantially-transmissive surface and a substantially-reflective surface opposite to the substantially-transmissive surface, the substantially-reflective surface obliquely facing the eyepiece lens, wherein the semi-transparent mirror is arranged in a manner that the projection of the first image enters through the substantially-transmissive surface and passes through the substantially-reflective surface towards the eyepiece lens, whilst the projection of the second image reflects from the substantially-reflective surface towards the eyepiece lens. It will be appreciated that the substantially-reflective surface of the semi-transparent mirror obliquely faces the eyepiece lens in a manner that the projection of the second image completely passes through the eyepiece lens, upon reflection from the substantially-reflective surface. By "substantially-transmissive" and "substantially-reflective", it is meant that a given surface has transmissivity and reflectivity that lies in a range of 60 percent to 95 percent, and more optionally, in a range of 75 percent to 90 percent, respectively.

Optionally, the optical combiner is positioned in the housing at approximately 35 to 50 degrees with respect to a surface of the first or second image source. For example, the optical combiner can be positioned in the housing at approximately 35, 36, 37, 38, 39, 40, 41, 42, 43, 44, 45, 46, 47, 48 or 49 degrees up to 36, 37, 38, 39, 40, 41, 42, 43, 44, 45, 46, 47, 48, 49 or 50 degrees with respect to the surface of the first or second image source. As an example, the optical combiner may be positioned at an angle of 45 degrees with respect to an image rendering surface of the first image source, and may be positioned at an angle of 40 degrees with respect to an image rendering surface of second image source.

Optionally, the optical combiner is positioned at a focal distance from the magnification lens. In other words, a distance between the optical combiner and the magnification lens is approximately equal to a focal length of the magnification lens.

The magnification lens is used for magnifying the second image to increase the image field of view, wherein the magnification lens is attached to the housing between the second image source and the optical combiner. Notably, the magnification lens is arranged on the optical path of the projection of the second image, such that a desired magnification of the second image is achieved when the projection of the second image passes through said magnification lens.

In such a case, the magnification lens can be understood to increase an apparent image field of view of the second image source. In an example, the magnification lens may be implemented using a plano-convex lens. In another example, the magnification lens may be implemented using a bi-convex lens.

Optionally, the magnification lens magnifies a size (namely, the angular width) of the second image. In such a case, the magnification lens enlarges the projection of the second image in a manner that a size of the second image that is visible to the user is greater than a size of the second image rendered by the second image source. Therefore, the magnification lens increases the apparent image field of view of the second image source. The magnification lens is manufactured using glass, plastic, or any other suitable material.

Optionally, a length of the optical path of the projection of the second image lies within a range of 1 metre to 1.5 metres. In other words, the optical distance travelled by the projection of the second image (notably, from the second image source to the user's eye, via the magnification lens and the optical combiner) lies within the range of 1 metre to 1.5 metres. For example, the length of the optical path of the projection of the second image may be from 1, 1.1, 1.2, 1.3 or 1.4 metres up to 1.1, 1.2, 1.3, 1.4 or 1.5 metres.

Optionally, the magnification lens is arranged in a proximity of the second image source. Such an arrangement of the magnification lens and the second image source allows the second image to appear sharp to the user for a wide range of optical path length of the projection of the second image. In an embodiment, the magnification lens is attached to the housing in a manner that said magnification lens is arranged on top of the second image source. In such a case, the magnification lens is airtightly mounted on the top of the second image source, thereby preventing dust from entering therebetween. In another embodiment, the magnification lens is attached to the housing in a manner that said magnification lens is arranged at a specific distance (for example, few millimeters) from the image rendering surface of the second image source. Optionally, in this regard, the distance between the magnification lens and the image rendering surface of the second image source lies in a range of 0.5 millimeters to 5 millimeters. For example, the magnification lens can be arranged at a distance of 0.5, 1.0, 1.5, 2.0, 2.5, 3.0, 3.5, 4.0 or 4.5 millimeters up to 1.0, 1.5, 2.0, 2.5, 3.0, 3.5, 4.0, 4.5 or 5.0 millimeters from the image rendering surface of the second image source. As an example, the magnification lens may be arranged at a distance of 2 millimeters from the image rendering surface of the second image source.

Optionally, the magnification lens enlarges the field of view to between approximately 15 to 45 degrees. In other words, the magnification lens enlarges a horizontal and vertical field of view in a range of 15 degrees to 45 degrees. Notably, in such a case, the image field of view of the second image source is lesser than 45 degrees, and can be enlarged by the magnification lens to lie between approximately 15 to 45 degrees. For example, the magnification lens can enlarge the field of view from 15, 16, 17, 18, 19, 20, 21, 22, 23, 24, 25, 26, 27, 28, 29, 30, 31, 32, 33, 34, 35, 36, 37, 38, 39, 40, 41, 42, 43 or 44 degrees up to 16, 17, 18, 19, 20, 21, 22, 23, 24, 25, 26, 27, 28, 29, 30, 31, 32, 33, 34, 35, 36, 37, 38, 39, 40, 41, 42, 43, 44 or 45 degrees.

As an example, the image field of view of the second image source may be equal to 10 degrees. The magnification lens may increase said image field of view to 30 degrees. As a result, the second image rendered at the second image source appears to have an angular width of 30 degrees.

As another example, the image field of view of the second image source may be equal to 20 degrees. The magnification lens may increase said image field of view to 40 degrees. As a result, the second image rendered at the second image source appears to have an angular width of 40 degrees.

Optionally, the magnification lens has a minimum refractive index of approximately 1.5. Optionally, the magnification lens has a refractive index of between approximately 1.5 to 2. For example, the magnification lens may have the refractive index from 1.5, 1.55, 1.6, 1.65, 1.7, 1.75, 1.8, 1.85, 1.9 or 1.95 up to 1.55, 1.6, 1.65, 1.7, 1.75, 1.8, 1.85, 1.9, 1.95 or 2.

Optionally, the magnification lens has a magnification of between approximately 1.2 to 1.6. In other words, the magnification of the magnification lens lies in a range of 1.2 to 1.6. For example, the magnification lens may have the magnification of between approximately 1.2, 1.25, 1.3, 1.35, 1.4, 1.45, 1.5 or 1.55 up to 1.25, 1.3, 1.35, 1.4, 1.45, 1.5, 1.55 or 1.6. In an example implementation, the magnification lens may have the magnification of 1.5. In another example implementation, the magnification lens may have the magnification of 1.25.

Furthermore, optionally, a length of the optical path of the projection of the first image lies within a range of 1 metre to 1.5 metres. For example, the length of the optical path of the projection of the first image may be from 1, 1.1, 1.2, 1.3 or 1.4 metres up to 1.1, 1.2, 1.3, 1.4 or 1.5 metres.

Each of the housings comprises the eyepiece lens. Throughout the present disclosure, the term "eyepiece lens" refers to an optical component configured to direct the combined projection including the projections of the first and second images, towards the user's eye, when the display apparatus is worn by the user. The eyepiece lens is mounted to the side of the housing that is opposite to the first image source, wherein the eyepiece lens is interposed between the optical combiner and the user's eye. The eyepiece lens faces the image rendering surface of the first image source.

Optionally, the eyepiece lens enables user's eyes to focus on close proximity in a distance of between approximately 30 to 80 mm. In other words, the eyepiece lens enables user's eyes to focus on close proximity in the distance in a range of 30 mm to 80 mm. In particular, the eyepiece lens enables the user's eyes to focus on the first image source that lies in the distance of between approximately 30 to 80 mm from the eyepiece lens. As a result, the eyepiece lens reduces the focal distance between the optical combiner and the user's eye. Due to optical properties of the eyepiece lens, an optical distance traveled by the projection of the first image from the first image source to the user's eye is increased. As a result, a physical distance between the user's eye and the first image source is reduced. For example, the eyepiece lens enables user's eyes to focus on close proximity in distance of between approximately 30, 35, 40, 45, 50, 55, 60, 65, 70 or 75 mm to 35, 40, 45, 50, 55, 60, 65, 70, 75 or 80 mm. Therefore, a distance between the eyepiece lens and the first image source lies between approximately 30, 35, 40, 45, 50, 55, 60, 65, 70 or 75 mm to 35, 40, 45, 50, 55, 60, 65, 70, 75 or 80 mm.

Optionally, the eyepiece lens is arranged in a manner that the first image source is arranged at a suitable position within the plurality of housings, thereby allowing the user to view the first image (rendered at the first image source) without any optical distortion. The first image source has the wide image field of view of between approximately 70 degrees to 140 degrees with respect to the perspective of the user's eye. Notably, the eyepiece lens allows the first image having such large angular width to be seen properly, even from the close physical distance between the user's eyes and the first image source.

Optionally, the eyepiece lens receives the projection of the first image and the projection of the second image and modifies the optical path and/or optical characteristics of the aforesaid projections, whilst directing the aforesaid projections towards the user's eye. In one example, the eyepiece lens may magnify a size (or angular dimensions) of the projection of the first image. In such an example, use of the magnifying eyepiece lens allows for use of a dimensionally small first image source within the display apparatus.

In an embodiment, the eyepiece lens is an injection molded plastic lens manufactured using an optical quality plastic. In another embodiment, the eyepiece lens is a glass lens manufactured using an optical quality glass.

Furthermore, optionally, the eyepiece lens is implemented by way of at least one of: a convex lens, a plano-convex lens, a Liquid Crystal (LC) lens, a liquid lens, a Fresnel lens, aspherical lens, achromatic lens.

Optionally, the eyepiece lens provides the focal distance of between approximately 25 to 100 mm. In other words, the focal distance of the eyepiece lens lies in a range of 25 mm to 100 mm. Specifically, the eyepiece lens provides the focal distance between the first image source and the user's eye in a range of 25 mm to 100 mm. For example, the eyepiece lens may provide the focal distance of between approximately 25, 30, 35, 40, 45, 50, 55, 60, 65, 70, 75, 80, 85, 90 or 95 mm to 30, 35, 40, 45, 50, 55, 60, 65, 70, 75, 80, 85, 90, 95 or 100 mm.

Optionally, the eyepiece lens has a diameter of between approximately 30 to 70 mm. In other words, the diameter of the eyepiece lens lies in a range of 30 mm to 70 mm. It will be appreciated that the diameter of the eyepiece is selected to be one that allows the combined projection (which comprises the projection of the first image and the projection of the second image) to properly pass therethrough. For example, the eyepiece lens may have the diameter of between approximately 30, 35, 40, 45, 50, 55, 60 or 65 mm to 35, 40, 45, 50, 55, 60, 65 or 70 mm.

Optionally, the eyepiece lens has a thickness of between approximately 8 to 10 mm. In other words, the thickness of the eyepiece lens lies in a range of 8 mm to 10 mm. For example, the eyepiece lens may have the thickness of between approximately 8, 8.1, 8.2, 8.3, 8.5, 8.6, 8.8, 8.9, 9, 9.1, 9.2, 9.3, 9.4, 9.5, 9.6, 9.7, 9.8 or 9.9 mm to 8.1, 8.2, 8.3, 8.5, 8.6, 8.8, 8.9, 9, 9.1, 9.2, 9.3, 9.4, 9.5, 9.6, 9.7, 9.8, 9.9 or 10 mm.

The controller is configured to control the output of the second image source to render colors to compensate for distortion and chromatic aberrations introduced by the magnification lens. The controller is implemented by way of hardware, software, firmware or a combination of these, for controlling the output of the second image source. Generally, the projection of the second image would undergo a certain degree of distortion and chromatic aberration upon passing though the magnification lens, due to optical properties of the magnifying lens. When such a projection would be incident upon the user's eyes, the distortions and color irregularities in the second image would be visible to the user. In order to compensate for such an unfavorable scenario, the controller is configured to adjust colors of the second image at a time of rendering the second image. Therefore, a color-compensated second image is rendered at the second image source. As a result, when the projection of such a color-compensated second image passes through the magnification lens towards the user's eyes, the user views a second image that is free from distortions and chromatic aberrations.

Optionally, the controller is configured to process the second image by employing at least one image processing operation. The controller controls the output of the second image source to render colors by way of such processing of the second image. Optionally, the at least one image processing operation is selected from the group consisting of: image sharpening, low pass filtering, color processing, gamma correction, and edge processing.

Optionally, the display apparatus further comprises means for detecting gaze direction, and the controller is coupled in communication with the means for detecting a gaze direction.

Throughout the present disclosure, the term "means for detecting the gaze direction" refers to specialized equipment for detecting and/or tracking the gaze direction of the user. Such specialized equipment are well known in the art. For example, the means for detecting the gaze direction can be implemented using contact lenses with sensors, cameras monitoring a position of a pupil of the user's eye, infrared (IR) light sources and IR cameras, a bright pupil-detection equipment, a dark pupil-detection equipment and the like. Beneficially, said means is arranged in a manner that it does not cause any obstruction in the user's view.

It will be appreciated that said means is employed to detect the gaze direction of the user repeatedly over a period of time, when the display apparatus in operation is worn by the user. Since the controller is coupled to the means for detecting the gaze direction of the user, the controller is configured to receive, from said means, information indicative of the detected gaze direction of the user. Optionally, the controller or the image source is configured to generate the first and second images, based upon an instantaneous gaze direction of the user detected during operation, in real-time or near real-time.

Optionally, the means for detecting gaze direction is to be employed to detect the gaze direction of the user's eye, for enabling the projection of the second image to be incident upon and around the fovea of the user's eye and for enabling the projection of the first image to be incident upon a retina of the user's eye, of which the fovea is just a small part. Therefore, even upon a change in the gaze direction (namely, due to a movement of the user's eye), the second image is projected on and around the fovea and the first image is projected on the retina, for implementing active foveation in the display apparatus.

Optionally, the means for detecting gaze direction comprises a plurality of eye-illuminating light sources for emitting light to illuminate the user's eye, and an eye-tracking camera for capturing an image of the user's eye and reflections of the emitted light from the user's eye. Optionally, in this regard, the controller is configured to process the image to detect the gaze direction of the user based upon a relative position of a pupil of the user's eye with respect to the reflections of the emitted light. Optionally, when processing the image, the controller is configured to differentiate said reflections of the emitted light from visual artifacts.

Optionally, each of the housings further comprises the eye-tracking camera mounted to the housing proximate the second image source. In an exemplary implementation, the eye-tracking camera is positioned beside the second image source. In such a case, the second image source and the eye-tracking camera are arranged in a manner that the second image source and the eye-tracking camera are angularly offset from the eyepiece lens, wherein the eyepiece lens is positioned in front of the user's eye. Optionally, in this regard, the projection of the second image is reflected from the optical combiner towards the eyepiece lens, and the reflections of the emitted light from the user's eye are reflected by the optical combiner towards the eye-tracking camera. Beneficially, the eye-tracking camera is to be positioned in front of the user's eye, thereby allowing for accurate detection of the gaze direction of the user for implementing gaze contingency via the display apparatus. When the eye-tracking camera is positioned in front of the user's eye, the light emitted by the plurality of eye-illuminating light sources falls directly upon the user's eye without being obstructed by eyelashes of the user.

Optionally, the controller is further configured to control the motorized threaded shaft in response to an output from the eye-tracking camera to adjust the spacing between the centers of the plurality of housings to correspond to an interpupillary distance of the user. Notably, the controller allows for an automatic adjustment of the spacing between the centers of the plurality of housings. When the gaze direction of the user changes, the relative position of the pupils of the user's eyes also changes. This results in a change in the interpupillary distance of the user. If the spacing between the centers of the plurality of housings is not adjusted according to the interpupillary distance of the user, the arrangement of the plurality of housings with respect to the user's eyes is improper. At such improper arrangement, the visual scene appears misaligned to the user. Therefore, the controller controls the motorized threaded shaft to adjust the spacing between the centers of the plurality of housings with respect to the change in the interpupillary distance of the user. This allows for the display apparatus to display a perfectly aligned visual scene to the user, thereby enhancing the user's experience of the simulated environment.

It will be appreciated that the spacing between the centers of the plurality of housings is to be adjusted corresponding to a current interpupillary distance of the user, based upon the detected gaze direction of the user, for implementing active foveation in the display apparatus. In such a case, the projections of the second image corresponding to the left and the right eyes of the user are correctly incident upon fovea of the left and the right eyes of the user, respectively. In an example, the spacing between the centers of the plurality of housings may be adjusted by employing a pair of rails and motorized screw, thereby allowing movement of the plurality of housings. Beneficially, such a movement of the plurality of housings compensates for varying interpupillary distance of the user based upon the detected gaze direction of the user.

Optionally, each of the housings further comprises the plurality of eye-illuminating light sources mounted to the housing proximate the eyepiece lens. More optionally, the plurality of eye-illuminating light sources are positioned in a manner that the plurality of eye-illuminating light sources are arranged either on a periphery of the eyepiece lens or are adjacent to the eyepiece lens. It will be appreciated that such an arrangement of the eye-illuminating light sources allows for minimal obstruction in the optical path between the eye-illuminating light sources and the user's eye.

The term "eye-illuminating light sources" refers to light sources configured to emit light of a specific wavelength. Optionally, the plurality of eye-illuminating light sources are configured to emit light of infrared or near-infrared wavelength. The emitted light of infrared or near-infrared wavelength are invisible to the human eye, thereby reducing unwanted distraction when such light is incident upon the user's eye. Alternatively, optionally, the plurality of eye-illuminating light sources are configured to emit light of a wavelength within visible spectrum.

Optionally, the plurality of eye-illuminating light sources are implemented by way of at least one of: infrared light emitting diodes, infrared lasers, infrared light projectors, infrared displays, visible light emitting diodes, visible light lasers, visible light projectors, visible light displays.

It will be appreciated that the plurality of eye-illuminating light sources are arranged near the user's eye such that the light emitted by the plurality of eye-illuminating light sources are incident upon the user's eye. For example, such light may be incident upon the cornea of the user's eye. In such an instance, the emitted light is reflected from an outer surface of the cornea of the user's eye, thereby constituting corneal reflections (namely, glints) in the user's eye.

Optionally, the plurality of eye-illuminating light sources have a specific shape. In such a case, a reflection of the light emitted from such eye-illuminating light sources can be easily identified in captured image. Notably, a given glint in the captured image can be identified to be a reflection of the plurality of eye-illuminating light sources, when the shape of the given glint is similar to the specific shape of the eye-illuminating light sources. Alternatively, the given glint in the captured image can be identified to be a visual artifact, when the shape of the given glint is different the specific shape of the eye-illuminating light sources.

Furthermore, optionally, the controller is configured to determine which reflection in the captured image corresponds to which eye-illuminating light source based on the specific shape of said eye-illuminating light source. In such a case, the controller is configured to map shape, rotational orientation and position of a given glint to shape, rotational orientation and position of the plurality of eye-illuminating light sources.

In an example implementation, the plurality of eye-illuminating light sources may be implemented using six infrared light sources having a V-shape.

Furthermore, the six infrared light sources may have different orientations (for example such as <, >, v, Λ and the like).

Optionally, the controller is configured to receive the input image and use the detected gaze direction to determine a region of visual accuracy of the input image. In an example, the input image may be received from an imaging device (for example, such as a digital camera) coupled to the display apparatus. In such a case, the imaging device may capture an image of a real-world environment as the input image to be projected onto the eye. The "region of visual accuracy of the input image" refers to a region of the input image whereat the detected gaze direction of the eye is focused. In another example, the input image may be received from a memory unit communicably coupled to the controller. Specifically, the memory unit may be configured to store the input image in a suitable format including, but not limited to, Joint Photographic Experts Group (JPEG), Tagged Image File Format (TIFF), Portable Network Graphics (PNG), Graphics Interchange Format (GIF), and Bitmap file format (BMP).

Optionally, the controller is configured to process the input image to generate the first image and the second image in a manner that the first image corresponds to an entirety of the input image, the second image corresponds to the region of visual accuracy of the input image, and a region of the first image that corresponds to the region of visual accuracy of the input image is masked.

Optionally, at the optical combiner, the first and second images are optically combined in a manner that the projection of the second image substantially overlaps the projection of the masked region of the first image. Hereinabove, by "substantially overlaps", it is meant that a misalignment between corresponding pixels of the second image and the pixels of the masked region of the first image lies within a range of 0 to 10 pixels, and more optionally, within a range of 0 to 5 pixels.

Optionally, when the region of the first image that corresponds to the region of visual accuracy of the input image is masked, the region of the first image that corresponds to the second image is masked. Such masking is performed for example, by dimming or darkening corresponding pixels of the first image.

It will be appreciated that the projection of the second image substantially overlaps with the projection of the masked region of the first image to avoid distortion of the region of visual accuracy of the input image. Specifically, the region of visual accuracy of the input image is represented within both, the first image of low resolution and the second image of high resolution. The overlap (or superimposition) of projections of low and high-resolution images of a same region would result in distortion of appearance of the same region. The second image contains more visual detail pertaining to the region of visual accuracy of the input image, as compared to the first image. Therefore, the region of the first image that substantially corresponds to the region of visual accuracy of the input image is masked, in order to project the high-resolution second image without distortion towards the user's eyes.

Optionally, the controller is configured to control the optical combiner to optically combine the projections of the first and second images. Optionally, in this regard, the controller is configured to adjust a position and/or an orientation of the optical combiner, via at least one actuator, in a manner that the projection of the second image substantially overlaps the projection of the masked region of the first image.

Additionally or alternatively, optionally, the controller is configured to adjust a position and/or an orientation of the first image source and/or the second image source, via at least one actuator, in a manner that the projection of the second image substantially overlaps the projection of the masked region of the first image.

Throughout the present disclosure, the term "actuator" refers to equipment (for example, such as electrical components, mechanical components, magnetic components, polymeric components, and so forth) that is employed to adjust position and/or orientation of a given component of the display apparatus.

Optionally, the first image and the second image are rendered substantially simultaneously. By "substantially simultaneously", it is meant that a time instant of rendering the first image and a time instant of rendering the second image lie within 200 milliseconds of each other, and more optionally, within 20 milliseconds of each other.

Optionally, the controller is configured to control the output of the first image source by performing at least one image processing operation. Optionally, in this regard, the at least one image processing operation may be implemented prior to or whilst rendering the first image.

The present disclosure also relates to the method as described above. Various embodiments and variants disclosed above apply mutatis mutandis to the method.

Optionally, the method further comprises using the eye-tracking camera mounted to the housing proximate the second image source to track movements of the user's eye.

Optionally, in the method, the adjustable device comprises the motorized threaded shaft connected between the plurality of housings, and wherein the method further comprises using the controller to control the motorized threaded shaft in response to the output from the eye-tracking camera to adjust the spacing between the centers of the plurality of housings to correspond to the interpupillary distance of the user.

Optionally, the method further comprises using the plurality of eye-illuminating light sources mounted to the housing proximate the eyepiece lens to illuminate the user's eye.

Optionally, in the method, the first image source has the resolution of between approximately 0.5 and 5.0 megapixels.

Optionally, in the method, the first image source has the resolution of approximately 1600×1200 pixels.

Optionally, in the method, the first image source has the diagonal dimension of between approximately 2 and 4 inches.

Optionally, in the method, the first image source has the image field of view of between approximately 70 to 140 degrees.

Optionally, in the method, the second image source has the resolution of approximately 1920×1080 pixels.

Optionally, in the method, the second image source has the 10 micrometer pixel size and the 3 micrometer sub-pixel size.

Optionally, in the method, the second image source has the diagonal dimension of between approximately 0.5 and 1.5 inches.

Optionally, in the method, the optical combiner comprises a silver-coated, semi-transparent glass mirror.

Optionally, in the method, the optical combiner comprises the semi-transparent mirror having the reflectivity of between approximately 10 to 60 percent, and the transmission of between approximately 85 to 40 percent.

Optionally, the method further comprises positioning the optical combiner in each housing at approximately 35 to 50 degrees with respect to the surface of the first or second image source.

Optionally, the method further comprises using the magnification lens to enlarge the field of view to between approximately 15 to 45 degrees.

Optionally, in the method, the magnification lens has the minimum refractive index of approximately 1.5.

Optionally, in the method, the magnification lens has the magnification of between approximately 1.2 to 1.6.

Optionally, the method further comprises using the eyepiece lens to provide the focal distance of between approximately 25 to 100 mm.

Optionally, in the method, the eyepiece lens has the diameter of between approximately 30 to 70 mm.

DETAILED DESCRIPTION OF THE DRAWINGS

Figure 1:
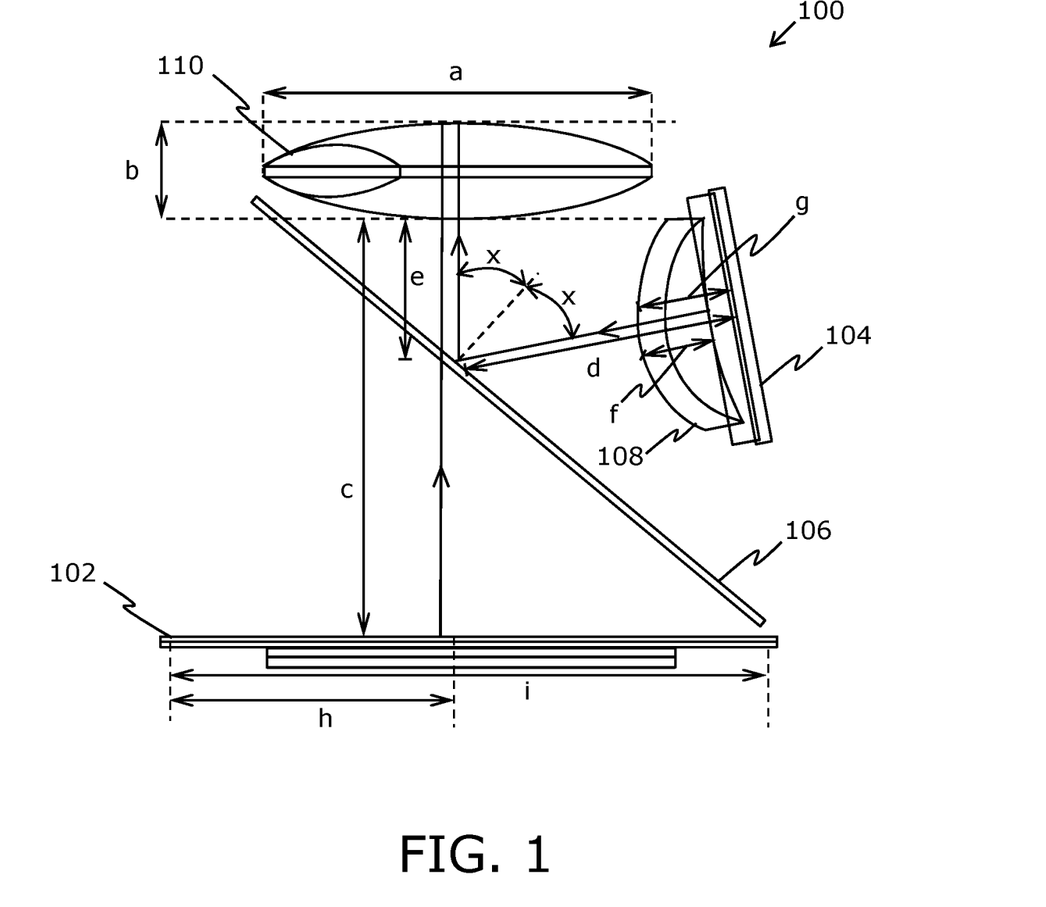
FIG. 1 illustrates a schematic view of a display apparatus, in accordance with an embodiment of the present disclosure.

Referring to FIG. 1, illustrated is a schematic view of a display apparatus, in accordance with an embodiment of the present disclosure. The display apparatus 100 comprises a plurality of housings (not shown) connected by an adjustable device (not shown) for setting a spacing between centers of the plurality of housings, wherein each of the housings comprising a first image source 102, a second image source 104, an optical combiner 106, a magnification lens 108, an eyepiece lens 110 and a controller (not shown). The first image source 102 is mounted to a side of the housing. The second image source 104 is mounted to the housing angularly offset from the first image source 102. The second image source 104 comprises a higher resolution and a narrower image field of view than the first image source 102. The optical combiner 106 is positioned in the housing in between the first image source 102 and second image source 104. On the optical combiner 106, a first image from the first image source 102 and a second image from the second image source 104 are superimposed and made visible to a user's eye. The magnification lens 108 is configured for magnifying the second image to increase the image field of view, wherein the magnification lens 108 is positioned between the second image source 104 and the optical combiner 106. The eyepiece lens 110 is mounted to a side of the housing opposite to the first image source 102 for reducing a focal distance between the optical combiner 106 and the user's eye, wherein the eyepiece lens 110 is interposed between the optical combiner 106 and the user's eye. The controller is configured to control an output of the second image source 104 to render colors to compensate for distortion and chromatic aberrations introduced by the magnification lens 108.

As shown, 'a' denotes a diameter of the eyepiece lens 110 whereas 'b' denotes a thickness of the eyepiece lens 110. Furthermore 'c' denotes a distance between the first image source 102 and the eyepiece lens 110. Moreover, 'd' denotes a distance between the second image source 104 and the optical combiner 106 and 'e' denotes a distance between the optical combiner 106 and the eyepiece lens 110. As shown, 'x' denotes an angle between an optical axis of the second image source 104 and an optical axis of the optical combiner 106, 'f' denotes thickness of the magnification lens 108 and 'g' denotes an overall thickness of an arrangement of the second image source 104 and the magnification lens 110. Furthermore, 'i' denotes a length (namely, a horizontal dimension) of the first image source 102 and 'h' is equal to half of the length 'i'.

Figure 2:
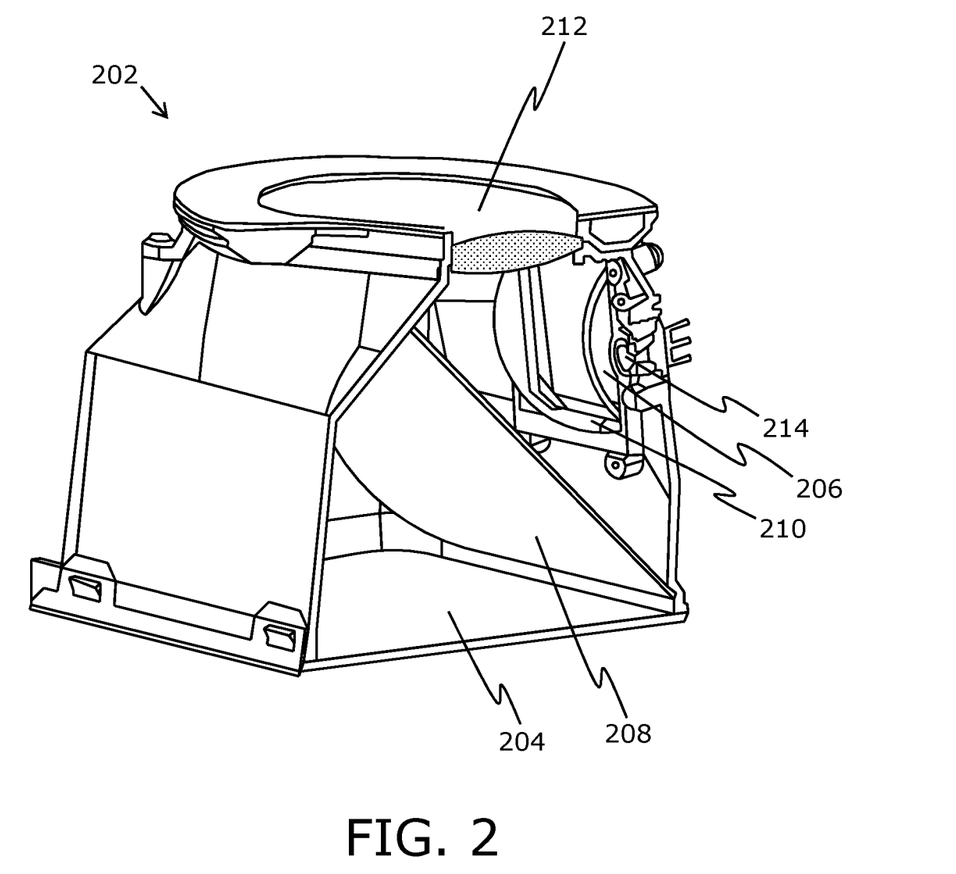
FIG. 2 illustrates a sectional view of a given housing, in accordance with an embodiment of the present disclosure.

Referring to FIG. 2, illustrated is a sectional view of a given housing 202, in accordance with an embodiment of the present disclosure. The given housing 202 comprises a first image source 204, a second image source 206, an optical combiner 208, a magnification lens 210, an eyepiece lens 212 and a controller (not shown). Furthermore, the given housing further comprises an eye-tracking camera 214 mounted to the housing proximate the second image source 206.

Figure 3:
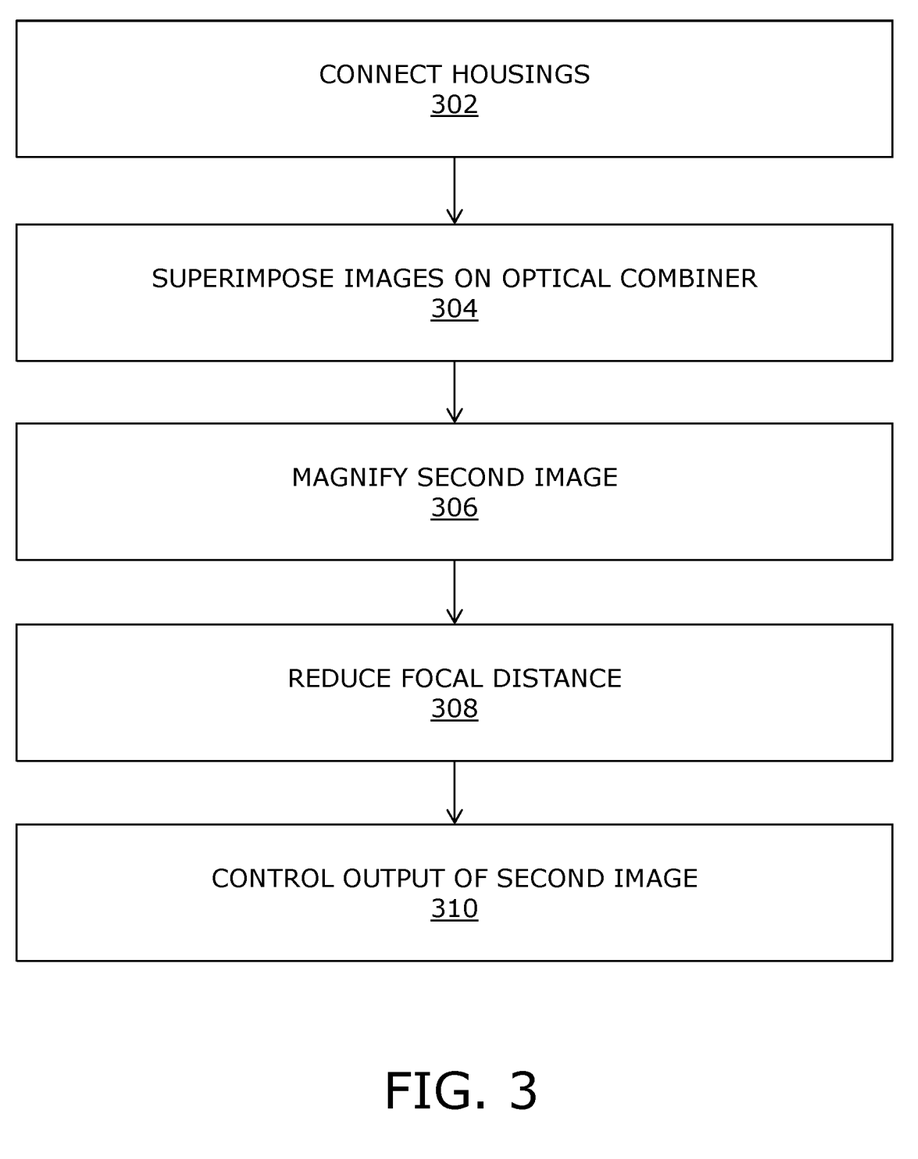
FIG. 3 illustrates steps of a method of displaying using a display apparatus, in accordance with an embodiment of the present disclosure.

Referring to FIG. 3, illustrated are steps of a method of displaying using a display apparatus, in accordance with an embodiment of the present disclosure. The display apparatus has a plurality of housings.

At a step 302, the plurality of housings are connected by an adjustable device for setting a spacing between centers of the plurality of housings.

At a step 304, a first image from a first image source mounted to a side of the housing, and a second image from a second image source mounted to the housing angularly offset from the first image source are superimposed using an optical combiner. The superimposed first and second images are made visible to a user's eye, wherein the second image source comprises a higher resolution and a narrower image field of view than the first image source.

At a step 306, the second image is magnified, using a magnification lens attached to the housing between the second image source and the optical combiner, to increase the image field of view.

At a step 308, a focal distance between the optical combiner and the user's eye is reduced, using an eyepiece lens mounted to a side of the housing, opposite the first image source and interposed between the optical combiner and the user's eye.

At a step 310, an output of the second image source is controlled using a controller to render colors to compensate for distortion and chromatic aberrations introduced by the magnification lens.

The steps 302, 304, 306, 308, and 310 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
   a plurality of housings connected by an adjustable device for setting a spacing between centers of the plurality of housings, each of the housings comprising:
   a first image source mounted to a side of the housing;
   a second image source mounted to the housing angularly offset from the first image source, wherein the second image source comprises a higher resolution and a narrower image field of view than the first image source;
   an optical combiner positioned in the housing between the first and second image sources, on which a first image from the first image source and a second image from the second image source are superimposed and made visible to a user's eye;
   a magnification lens for magnifying the second image to increase the image field of view, wherein the magnification lens is attached to the housing between the second image source and the optical combiner;
   an eyepiece lens for reducing a focal distance between the optical combiner and the user's eye, wherein the eyepiece lens is mounted to a side of the housing opposite the first image source, wherein the eyepiece lens is interposed between the optical combiner and the user's eye; and
   a controller configured to control an output of the second image source to render colors to compensate for distortion and chromatic aberrations introduced by the magnification lens.

2. The display apparatus of claim 1, wherein each of the housings further comprises an eye-tracking camera mounted to the housing proximate the second image source.

3. The display apparatus of claim 2, wherein the adjustable device comprises a motorized threaded shaft connected between the plurality of housings.

4. The display apparatus of claim 3, wherein the controller is further configured to control the motorized threaded shaft in response to an output from the eye-tracking camera to adjust the spacing between the centers of the plurality of housings to correspond to an interpupillary distance of the user.

5. The display apparatus of claim 1, wherein each of the housings further comprises a plurality of eye-illuminating light sources mounted proximate the eyepiece lens.

6. The display apparatus of claim 1, wherein the first image source has a resolution of between approximately 0.5 and 5.0 megapixels.

7. The display apparatus of claim 1, wherein the first image source has a resolution of approximately 1600×1200 pixels.

8. The display apparatus of claim 1, wherein the first image source has a diagonal dimension of between approximately 2 and 4 inches.

9. The display apparatus of claim 1, wherein the first image source has an image field of view of between approximately 70 to 140 degrees.

10. The display apparatus of claim 1, wherein the second image source has a resolution of approximately 1920×1080 pixels.

11. The display apparatus of claim 1, wherein the second image source has a 10 micrometer pixel size and a 3 micrometer sub-pixel size.

12. The display apparatus of claim 1, wherein the second image source has a diagonal dimension of between approximately 0.5 and 1.5 inches.

13. The display apparatus of claim 1, wherein the optical combiner comprises a silver-coated, semi-transparent glass mirror.

14. The display apparatus of claim 1, wherein the optical combiner comprises a semi-transparent mirror having a reflectivity of between approximately 10 to 60 percent, and a transmission of between approximately 85 to 40 percent.

15. The display apparatus of claim 1, wherein the optical combiner is positioned in the housing at approximately 35 to 50 degrees with respect to a surface of the first or second image source.

16. The display apparatus of claim 1, wherein the magnification lens enlarges the field of view to between approximately 15 to 45 degrees.

17. The display apparatus of claim 1, wherein the magnification lens has a minimum refractive index of approximately 1.5.

18. The display apparatus of claim 1, wherein the magnification lens has a magnification of between approximately 1.2 to 1.6.

19. The display apparatus of claim 1, wherein the eyepiece lens provides the focal distance of between approximately 25 to 100 mm.

20. The display apparatus of claim 1, wherein the eyepiece lens has a diameter of between approximately 30 to 70 mm.

21. A method of displaying using a display apparatus having a plurality of housings, the method comprising:
connecting the plurality of housings by an adjustable device for setting a spacing between centers of the plurality of housings;
within each housing:
using an optical combiner to:
superimpose a first image from a first image source mounted to a side of the housing, and a second image from a second image source mounted to the housing angularly offset from the first image source; and
make visible to a user's eye the superimposed first and second images, wherein the second image source comprises a higher resolution and a narrower image field of view than the first image source;
using a magnification lens, attached to the housing between the second image source and the optical combiner, to magnify the second image to increase the image field of view;
using an eyepiece lens, mounted to a side of the housing, opposite the first image source and interposed between the optical combiner and the user's eye, to reduce a focal distance between the optical combiner and the user's eye; and
using a controller to control an output of the second image source to render colors to compensate for distortion and chromatic aberrations introduced by the magnification lens.

22. The method of claim 21, further comprising using an eye-tracking camera mounted to the housing proximate the second image source to track movements of the user's eye.

23. The method of claim 21, wherein the adjustable device comprises a motorized threaded shaft connected between the plurality of housings, and wherein the method further comprises using the controller to control the motorized threaded shaft in response to an output from an eye-tracking camera to adjust the spacing between the centers of the plurality of housings to correspond to an interpupillary distance of the user.

24. The method of claim 21, wherein the method further comprises using a plurality of eye-illuminating light sources mounted proximate the eyepiece lens to illuminate the user's eye.

25. The method of claim 21, wherein the first image source has a resolution of between approximately 0.5 and 5.0 megapixels.

26. The method of claim 21, wherein the first image source has a resolution of approximately 1600×1200 pixels.

27. The method of claim 21, wherein the first image source has a diagonal dimension of between approximately 2 and 4 inches.

28. The method of claim 21, wherein the first image source has an image field of view of between approximately 70 to 140 degrees.

29. The method of claim 21, wherein the second image source has a resolution of approximately 1920×1080 pixels.

30. The method of claim 21, wherein the second image source has a 10 micrometer pixel size and a 3 micrometer sub-pixel size.

31. The method of claim 21, wherein the second image source has a diagonal dimension of between approximately 0.5 and 1.5 inches.

32. The method of claim 21, wherein the optical combiner comprises a silver-coated, semi-transparent glass mirror.

33. The method of claim 21, wherein the optical combiner comprises a semi-transparent mirror having a reflectivity of between approximately 10 to 60 percent, and a transmission of between approximately 85 to 40 percent.

34. The method of claim 21, further comprising positioning the optical combiner in each housing at approximately 35 to 50 degrees with respect to a surface of the first or second image source.

35. The method of claim 21, further comprising using the magnification lens to enlarge the field of view to between approximately 15 to 45 degrees.

36. The method of claim 21, wherein the magnification lens has a minimum refractive index of approximately 1.5.

37. The method of claim 21, wherein the magnification lens has a magnification of between approximately 1.2 to 1.6.

38. The method of claim 21, further comprising using the eyepiece lens to provide the focal distance of between approximately −25 to 100 mm.

39. The method of claim 21, wherein the eyepiece lens has a diameter of between approximately 30 to 70 mm.

* * * * *